US009860420B2

(12) United States Patent
Sugiyama (10) Patent No.: US 9,860,420 B2
(45) Date of Patent: *Jan. 2, 2018

(54) DECOLORING APPARATUS (71) Applicants: KABUSHIKI KAISHA TOSHIBA, Tokyo (JP); TOSHIBA TEC KABUSHIKI KAISHA, Tokyo (JP)

(72) Inventor: Hiroyuki Sugiyama, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/357,027

(22) Filed: Nov. 21, 2016

(65) Prior Publication Data

US 2017/0070644 A1  Mar. 9, 2017

Related U.S. Application Data (63) Continuation of application No. 14/995,657, filed on Jan. 14, 2016, now Pat. No. 9,516,195, which is a continuation of application No. 14/570,807, filed on Dec. 15, 2014, now Pat. No. 9,266,374.

(51) Int. Cl.
| *H04N 1/387* | (2006.01) |
| *B41M 7/00* | (2006.01) |
| *H04N 1/00* | (2006.01) |
| *H04N 1/60* | (2006.01) |

(52) U.S. Cl.
CPC ........ *H04N 1/3876* (2013.01); *B41M 7/0009* (2013.01); *H04N 1/0032* (2013.01); *H04N 1/0057* (2013.01); *H04N 1/00588* (2013.01); *H04N 1/00636* (2013.01);
(Continued)

(58) Field of Classification Search
CPC ..... B41M 7/001; B41M 7/0009; B41M 7/009
See application file for complete search history.

(56) References Cited

U.S. PATENT DOCUMENTS

| 8,743,164 | B2 | 6/2014 | Iguchi et al. |
| 9,266,374 | B1 | 2/2016 | Sugiyama |
| 9,516,195 | B2 * | 12/2016 | Sugiyama ............ B41M 7/0009 |

(Continued)

FOREIGN PATENT DOCUMENTS

JP  2010-141686  6/2010

*Primary Examiner* — Kristal Feggins
(74) *Attorney, Agent, or Firm* — Patterson & Sheridan, LLP (57) ABSTRACT A reading apparatus includes a paper feed section that feeds a sheet on which an image is formed with decolorable material to a conveyance path. A reading section positioned on the conveyance path reads the image formed on the sheet and generates image data corresponding to the read image. A paper discharge section discharges the sheet after the reading section has read the image. If the reading section reads a portion of the image formed on the sheet due to an error, the sheet is conveyed to the reading section again to read a remainder portion of the image that was not initially read in the reading section and to generate image data corresponding to the remainder portion of the image. The image data corresponding to the read portion of the image is combined with the image data corresponding to the remainder portion of the image.

10 Claims, 9 Drawing Sheets (52) U.S. Cl.
CPC ..... *H04N 1/00795* (2013.01); *H04N 1/00816* (2013.01); *H04N 1/60* (2013.01); *H04N 2201/0094* (2013.01)

(56) References Cited

U.S. PATENT DOCUMENTS

| | | |
|---|---|---|
| 2010/0321457 A1 | 12/2010 | Kawaguchi et al. |
| 2011/0221852 A1 | 9/2011 | Yahata et al. |
| 2012/0038732 A1 | 2/2012 | Iguchi et al. |

\* cited by examiner

DECOLORING APPARATUS

CROSS-REFERENCE TO RELATED APPLICATIONS

This application is a continuation of U.S. patent application Ser. No. 14/995,657, filed on Jan. 14, 2016, which is a continuation of U.S. patent application Ser. No. 14/570,807, filed on Dec. 15, 2014, now U.S. Pat. No. 9,266,374, issued on Feb. 23, 2016, the entire contents of each of which are incorporated herein by reference.

FIELD

Embodiments described herein relate to a decoloring apparatus.

BACKGROUND

Conventionally, paper on which an image is formed with decolorable toner is heated and subjected to decoloring processing in a decoloring apparatus to decolor the image thereon. In addition to a heat source for carrying out the decoloring processing, the decoloring apparatus also includes with a reading device which reads the image formed on the paper before the paper is subjected to the decoloring processing. The reading device may also determine whether or not the image on the paper is decolored after the decoloring processing.

However, there is a problem with such an arrangement. In a case in which the reading operation is stopped due to an error and the like before the paper which is not yet subjected to decoloring processing is read completely, part of the paper is decolored due to the relation between the length of the conveyance path and the paper position, and the paper cannot be stored correctly.

DETAILED DESCRIPTION

In accordance with one embodiment, a decoloring apparatus comprises a paper feed section configured to feed a sheet on which an image is formed with decolorable material to a conveyance path, a reading section positioned on the conveyance path and configured to read the image formed on the sheet and to generate image data corresponding to the read image, a decoloring section positioned on the conveyance path downstream of the reading section in a document conveying direction and configured to decolor the image formed on the sheet, a paper discharge section configured to discharge the sheet after the decoloring section has decolored the image, and a control section configured to perform control to, in a case in which the reading section reads a portion of the image formed on the sheet due to an error: after the error is resolved, convey the sheet to the reading section again to read a remainder portion of the image that was not initially read in the reading section and to generate image data corresponding to the remainder portion of the image, and combine the image data corresponding to the read portion of the image with the image data corresponding to the remainder portion of the image.

Hereinafter, the embodiment is described in detail with reference to the accompanying drawings.

Figure 1:
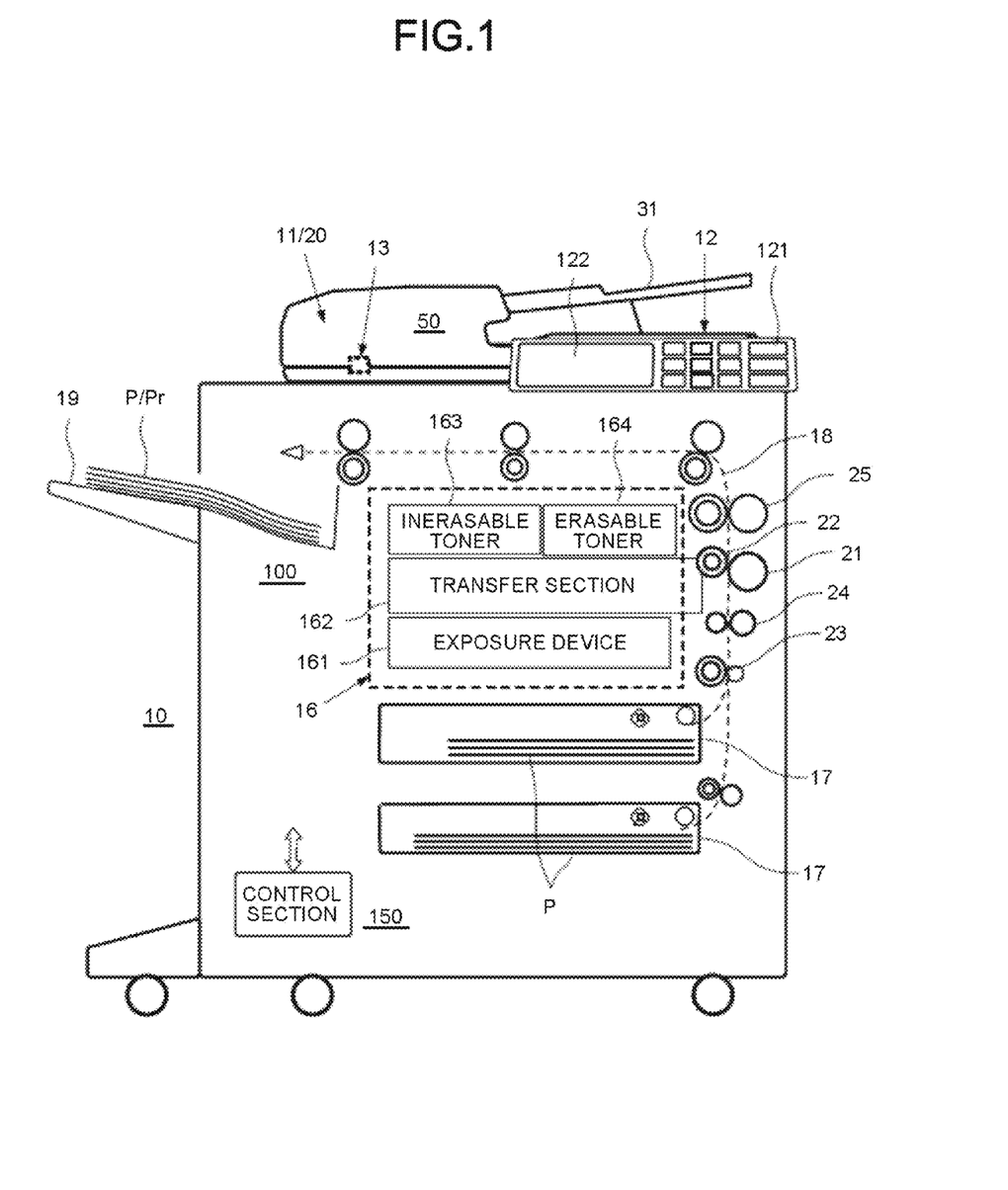
FIG. 1 is a diagram illustrating a schematic arrangement of a decoloring apparatus according to an embodiment.
Figure 2:
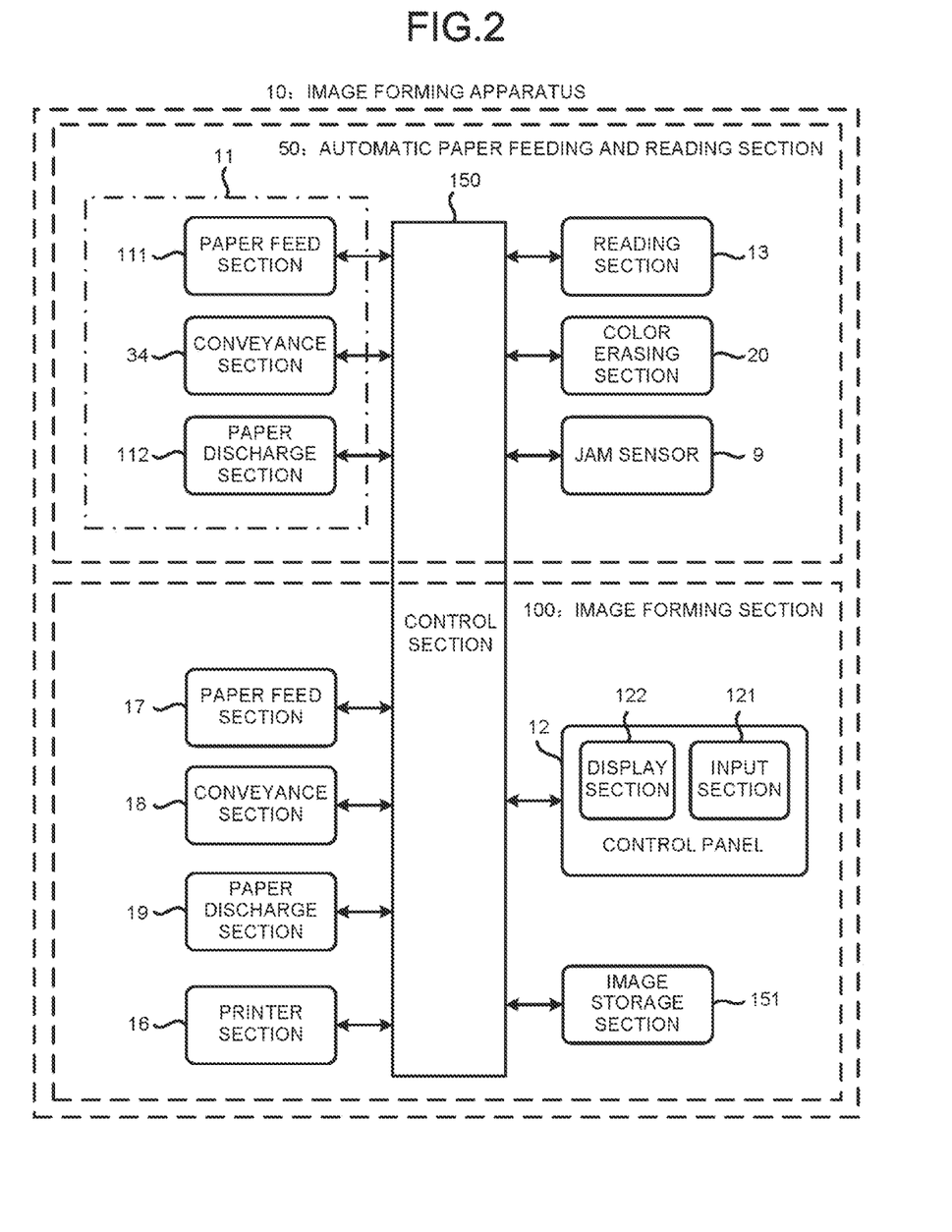
FIG. 2 is a diagram illustrating an example hardware configuration of an image forming apparatus.

FIG. 1 is a diagram illustrating a schematic arrangement of a decoloring apparatus according to one embodiment. FIG. 1 exemplifies an image forming apparatus 10 provided with an image forming section and a decoloring section. FIG. 2 is a diagram illustrating an example hardware configuration of the image forming apparatus 10.

The image forming apparatus 10 includes an automatic paper feeding and reading section 50 and an image forming section 100. A control section 150 provides overall control of the image forming apparatus 10. The control section 150 includes, as main portions, a CPU (Central Processing Unit), an ROM (Read Only Memory), a RAM (Random Access Memory), a nonvolatile memory and the like (none is shown). The ROM stores various programs according to which the CPU executes processing to realize each function of the image forming apparatus 10. The RAM is used as a work memory for temporarily storing various data generated when the CPU executes the programs. The nonvolatile memory stores user information and various kinds of setting information which need to be stored even if the power source is turned off.

The image forming apparatus 10 may be an MFP (Multi-Function Peripheral) which has a scanning function, a copy function, a printing function and the like. The scanning function refers to reading a document optically to acquire image data. The copy function refers to reading an original, and printing and outputting a copy image of the original on image receiving paper based on the image data acquired through the reading processing. The copy function further refers to printing and outputting an image obtained by rasterizing printing data received from an external terminal on paper.

The image forming apparatus 10 further has a decoloring function for decoloring an image which is printed on a document with decolorable toner serving as decolorable agent to reuse the paper as printing paper. The decoloring function refers to heating a document to decolor the image formed on the document.

The automatic paper feeding and reading section 50 includes an automatic document conveyance section 11, a reading section 13 and the like. The automatic paper feeding and reading section 50 further includes a decoloring section 20.

The automatic document conveyance section 11 includes a paper feed section 111, a conveyance section 34 and a paper discharge section 112. The automatic document conveyance section 11 has a function of separating and feeding, one by one, a document set on a document table and conveying the document to a paper discharge position through a conveyance path passing through a given reading position. The automatic document conveyance section 11 is described later.

A control panel 12 includes a display section 122 and an input section 121 which consists of various keys. The control panel 12 displays various kinds of information such as the setting information and the operation status of the image forming apparatus 10.

The input section 121 includes, for example, a numeric keypad for inputting the number of printings, a FAX number, an ID number, a mail address and the like, a scanning key, a copy key, a facsimile key, a mail sending key, a paper selection key, a start key and the like. Further, the input section 121 may include, for example, input keys for inputting numbers, a keyboard, a mouse, a touch panel, a touch pad, a pen tablet, a dedicated button and the like.

The display section 122 may include, for example, an electronic paper display, an LCD (Liquid crystal display), an EL (Electronic Luminescence) display and the like. Further, the display section 122, if configured as a touch panel display, can realize all or part of the functions of the input section 121.

The reading section 13 is a general image reading device arranged in an image sensor copier or an image scanner and the like. The image forming apparatus 10 is used when copying an original or reading a document. The reading section 13 is one example of an input section of printing document. In addition, the reading section 13 can receive a document created in, for example, a PC serving as an external terminal and print the document as image data.

Figure 3:
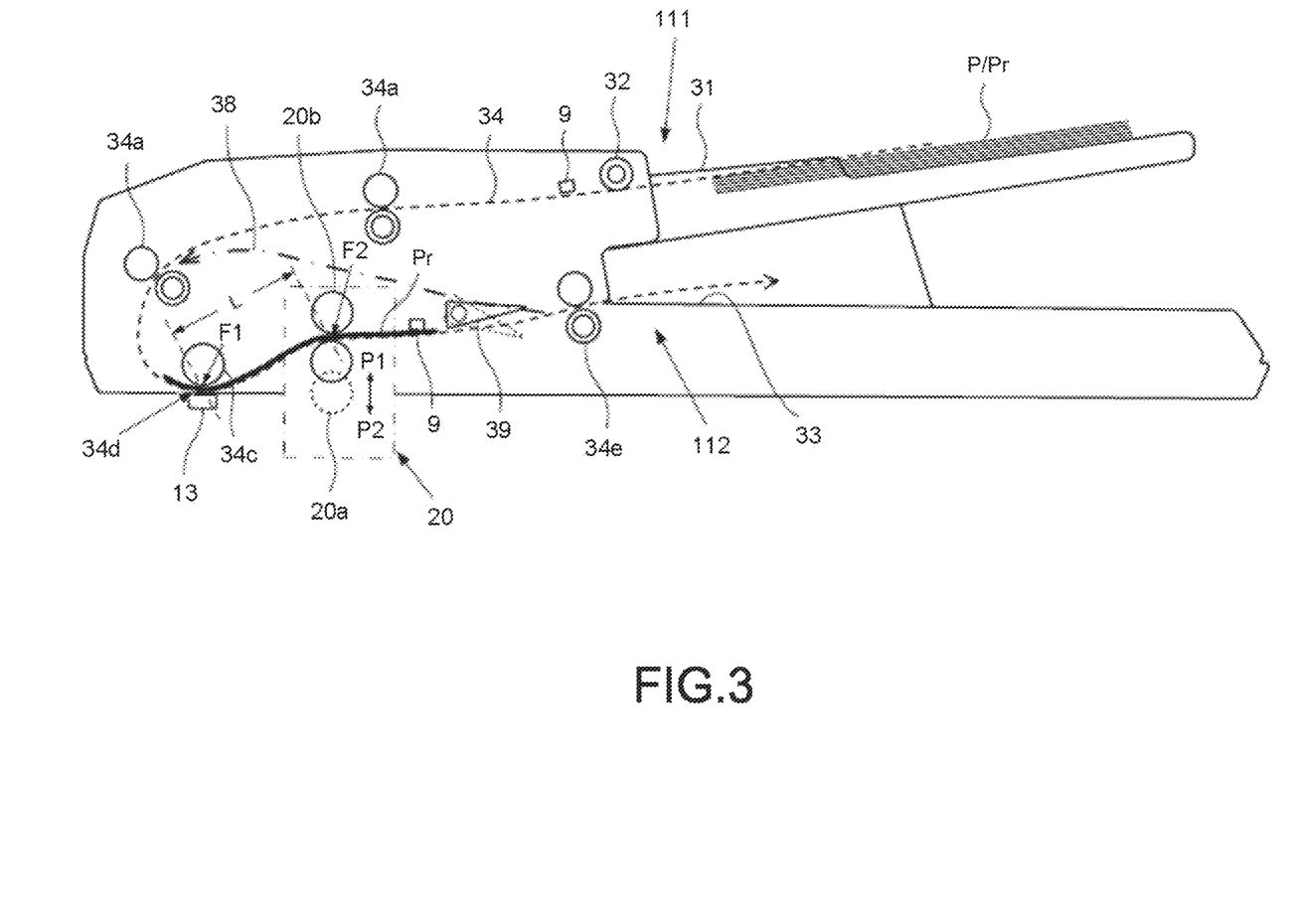
FIG. 3 is a diagram illustrating an automatic paper feeding and reading section.

The decoloring section 20 is positioned on the conveyance path 34 for conveying the document in the automatic document conveyance section 11. The decoloring section 20 has a function of heating paper printed with decolorable toner to decolor an image formed on the paper. The decoloring section 20 is described later.

The image forming section 100 consists of the control panel 12, a printer section 16, a paper feed section 17, a conveyance section 18, a paper discharge section 19 and an image storage section 151 and the like.

The image storage section 151 is a nonvolatile high-capacity storage device used for storing image data read by the reading section 13 and the like. Herein, the image storage section 151 may be, for example, a hard disk device with an associated controller.

The printer section 16 includes an exposure device 161, a transfer section 162, non-decolorable toner 163 and decolorable toner 164 and the like. The printer section 16, which serves as an image forming section, includes a laser exposure device and the like. The printer section 16 processes the image data read by the reading section 13 or the image data created by a PC and the like, and forms an image on paper P. The paper on which an image is formed by the printer section 16 is discharged to the paper discharge section 19.

Herein, a "decoloring processing" is carried out on a paper to decolor the image formed with the decolorable toner 164 serving as a decolorable material on the paper. The decolorable material includes a color generation compound, a color developing agent and a decoloring agent. For the color generation compound, for example, a leuco dye can be used. For the color developing agent, for example, a phenol group can be used. For the decoloring agent, a substance which combines with the color generation compound when being heated, and furthermore, does not have affinity with the color developing agent can be listed. The decolorable material generates a color through the interaction of the color generation compound and the color developing agent, and as the interaction of the color generation compound and the color developing agent is eliminated by the heating above a decoloring temperature, the color of the decolorable material is decolored. In addition to the decolorable toner, decolorable ink may also be used as the decolorable material.

In addition, the "decoloring" in the present embodiment refers to making the image (which is formed in a color including not only chromatic colors but also monochromatic color such as white color, black color and the like) that is different from the background color of the paper, invisible or hard to see. Herein, in addition to decoloring the image formed in a color different from the background color of the paper, "making the image invisible" further includes changing the image formed in a color different from the background color of the paper to a color which is the same as or approximately the same as the background color of the paper.

The exposure device 161 scans, in an axis direction of a photoconductive drum (not shown) rotating through a polygon mirror, a laser beam which is emitted from a semiconductor laser device and is modulated according to the image data. An electrostatic latent image is formed on the photoconductive drum by irradiating the photoconductive drum with the laser beam.

An endless intermediate transfer belt for carrying out intermediate transfer of the electrostatic latent image on the photoconductive drum is arranged inside the transfer section 162. The image transferred to the intermediate transfer belt is further transferred by a transfer roller 21. A driving roller 22 provides tension to the intermediate transfer belt and also drives the intermediate transfer belt.

Further, a conveyance path 18—including a separation roller 23 for picking up the paper P from the paper feed section 17 and a register roller 24—is arranged to extend from the paper feed section 17 including a paper feed roller to the paper discharge section 19 including a paper discharge roller.

The paper P picked up by the separation roller 23 is conveyed to a secondary transfer position between the intermediate transfer belt and the transfer roller 21 through the register roller 24. A secondary transfer voltage is applied to the paper P through the transfer roller 21 when the paper P passes through the secondary transfer position. The toner image on the intermediate transfer belt is secondarily transferred to the paper P.

A fixing device 25 is arranged at the downstream side of the transfer section 162 in the direction of paper conveyance by the register roller 24. The paper discharge section 19 is arranged at the downstream side of the fixing device 25. The paper P on which the toner image is fixed by the fixing device 25 is discharged to the paper discharge section 19. In addition, in a case of double-sided printing, the paper P is reversed through a reversal conveyance path (not shown) and guided towards the direction of the transfer roller 21.

In a case in which an image is formed on the paper with the decolorable toner 164, the paper is discharged to the paper discharge section 19 as paper Pr through the same processing carried out in a case of printing with the non-decolorable toner 163.

The automatic document conveyance section 11, the reading section 13 and the decoloring section 20 are further described with reference to FIG. 3.

The automatic document conveyance section 11 separates and conveys, one by one, a plurality of documents P or documents Pr on which images are formed with the decolorable toner set on the document table 31, and reads and discharges the document P or the document Pr. The automatic document conveyance section 11 includes the paper feed section 111, the conveyance section 34, the reading section 13 and the paper discharge section 112.

The paper feed section 111 includes the document table 31 and a feed roller 32 which separates and feeds, one by one, the documents P placed on the document table 31 in order of the topmost document.

The conveyance section 34 indicated by a dashed arrow shown in FIG. 3 conveys the document P fed by the feed roller 32 towards a paper discharge tray 33 via a reading position F1 of the reading section 13.

The conveyance path 34 includes, for example, a guide wall (not shown) arranged along the conveyance path 34, a plurality of pairs of conveyance rollers 34a and conveying-out rollers 34b arranged at appropriate places to nip the document from the front and back side of the document, a contact roller 34c for pressing the document from the back side to contact the document with the reading position F1, and a conveyance motor (not shown) for driving the conveyance roller 34a, the conveying-out roller 34b and the contact roller 34c.

The conveyance path 34 is a sideways u-shaped path starting from the document table 31 and ending at the paper discharge tray below the document table 31. The reading position F1 is a little more downstream than the bent portion of the U-shape. A slit 34d is arranged at the guide wall of the conveyance path 34 at the reading position F1. The reading section 13 reads the document through the slit 34d.

The decoloring section 20 has a heating position F2 for heating the document at a temperature at which the decolorable material is decolored. The decoloring section 20 is arranged on the conveyance path 34 at a given position at the downstream side of the reading position F1 for reading the document conveyed on the conveyance path 34.

The decoloring section 20 includes, for example, a heat roller 20a provided with an electric heater for generating heat through electricity, and a conveyance roller 20b. The heat roller 20a is positioned by a mechanism which displaces the heat roller 20a to a position P1 during heating process and to a position P2 during non-heating process. For example, the mechanism includes a spring for moving the heat roller 20a towards the paper non-contact position P2, and a solenoid which moves, when energized, the heat roller 20a to the paper contact position P1 against the force of the spring. The paper contact position P1 of the heat roller 20a is indicated by a solid line and the paper non-contact position P2 is indicated by a dashed line.

Whether to move the heat roller 20a to the paper contact position P1 or the paper non-contact position P2 is set according to the control of the control section 150. The energization of the heat roller 20a can be carried out by interlocking with, for example, the movement to the position P1 or P2 based on the control of the control section 150.

The document Pr is heated by the heat roller 20a positioned the paper contact position P1 while passing through the decoloring section 20. In this way, the image on the document Pr can be decolored.

The paper discharge section 112 includes the paper discharge tray 33 and a paper discharge roller 34e for discharging the paper conveyed on the conveyance path 34 to the paper discharge tray 33.

Further, the automatic document conveyance section 11 includes a switchback path 38 shown by an arrow indicated by one dotted line for reversing the front and back side of the document passing through the reading position F1 and conveying the document to the upstream side of the reading position F1 again. The switchback path 38 includes a guide wall forming the passage of the document and a switching lever 39 for switching between conveyance paths of the document. Generally, the switching lever 39 is urged by a spring to a position (shown by a solid line) at which the front end thereof is lifted up a little, and during energization, the switching lever 39 is moved to a reversal position (shown by a dashed line) at which the front end thereof is pushed down through a solenoid against the force of the spring.

A jam sensor 9 for detecting a paper jam during the conveyance process of the document P or the document Pr is arranged on the conveyance path 34 of the automatic document conveyance section 11. The detection information of the jam sensor 9 is supplied to the control section 150. The jam sensors 9 are arranged at a plurality of positions so that the jam of the document P or the document Pr can be detected regardless of the jam position.

In addition, in a case of an automatic document conveyance section 11 provided with no switchback path 38, the conveyance roller 20b of the decoloring section 20 is also used as a heat roller equipped with a displacement mechanism, which can cope with decoloring the paper on both sides of which images are recorded with the decolorable toner.

In this way, the automatic document conveyance section 11 conveys different kinds of paper such as the document P to be printed and the document Pr. In a case of a document P, printing operation is carried out on the document P with the non-decolorable toner 163 or the decolorable toner 164 based on the image data read by the reading section 13. Whether to carry out printing with the non-decolorable toner 163 or the decolorable toner 164 is selected through the operation on the control panel 12 by an operator.

Moreover, in a case of the document Pr, the image on the document Pr is decolored based on an operation set in the control panel 12 by the operator. The decoloring of the document Pr is carried out by moving the heat roller 20a to the heating position P1 and heating the document Pr conveyed on the conveyance path 34. The document Pr subjected to decoloring processing by heating is discharged to the paper discharge tray 33. The discharged document Pr can be reused as the printing paper.

However, as shown by the conveyed document Pr shown by a thick line in FIG. 3 on which an image is formed with decolorable toner, the preceding part of the document Pr is passing through the decoloring section 20, while the trailing part of the document Pr includes a part which has passed through the reading section 13 and a part which is to pass through the reading section 13. The document Pr in this state can be divided into three parts, that is, a part already subjected to decoloring processing, a part subjected to reading processing and a part to be subjected to reading processing. That is, the document Pr that is longer than a distance L between the reading position F1 and the decoloring position F2 is in a state of extending from a position behind the reading position F1 to a position in front of the decoloring position F2 (refer to FIG. 3).

A document image data correction method in a case in which a reading error occurs due to paper jam before the reading processing is described with reference to FIG. 4-FIG. 9.

Figure 4:
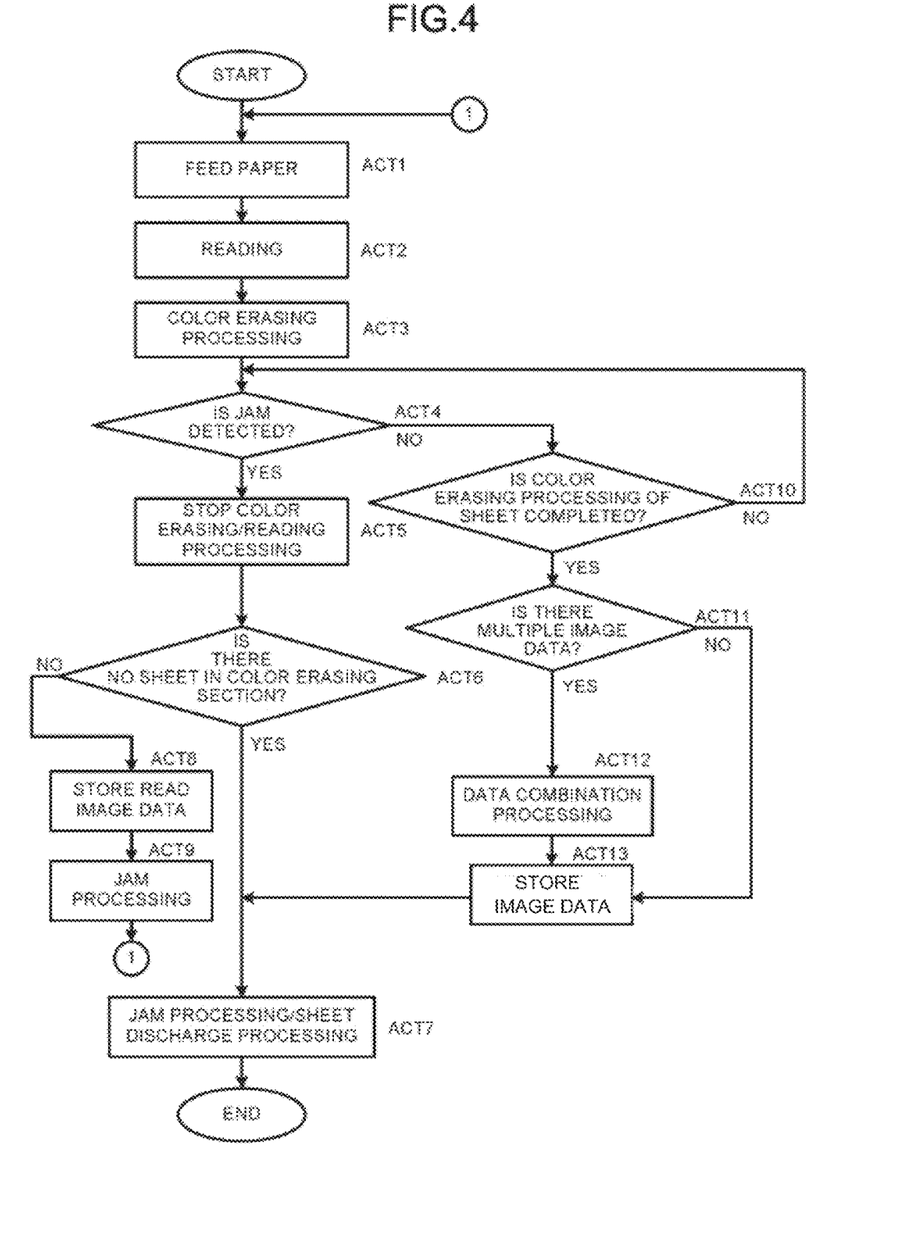
FIG. 4 is a flowchart illustrating an example sequence of operations for image combination processing.

FIG. 4 is a flowchart illustrating an example sequence of operations for read image data restoring processing, i.e., image combination processing, in a case in which a reading error occurs.

The document Pr is set on the document table 31 and the decoloring operation of the document Pr is carried out through the control panel 12. The control section 150 drives the paper feed section 111 and the conveyance path 34 of the automatic document conveyance section 11 to feed the document Pr (ACT 1).

The document Pr is conveyed to the reading section 13 on the conveyance path 34, and the content thereof is read by the reading section 13 (ACT 2).

Next, the document Pr is conveyed to the decoloring section 20, and the heat roller 20a is moved from the paper non-contact position P2 to the paper contact position P1 to heat the document Pr to carry out decoloring processing (ACT 3), and then processing proceeds to ACT 4.

In ACT 4, it is determined whether or not the jam sensor 9 detects a paper jam. In a case in which the jam sensor 9 detects a paper jam (YES in ACT 4), processing proceeds to ACT 5.

In ACT 5, the reading processing by the reading section 13 and the decoloring processing by the decoloring section 20 are stopped, and then processing proceeds to ACT 6.

In ACT 6, it is determined whether there is no document Pr at the position of the decoloring section 20. If it is determined that there is no document Pr at the position of the decoloring section 20 (YES in ACT 6), the jam processing or the sheet discharge processing is carried out (ACT 7), and then the processing is ended. In addition, in ACT 7, a display processing is executed to urge the operator to carry out the jam processing or the sheet discharge processing, however, the display processing may be carried out through an alarm.

Figure 5:
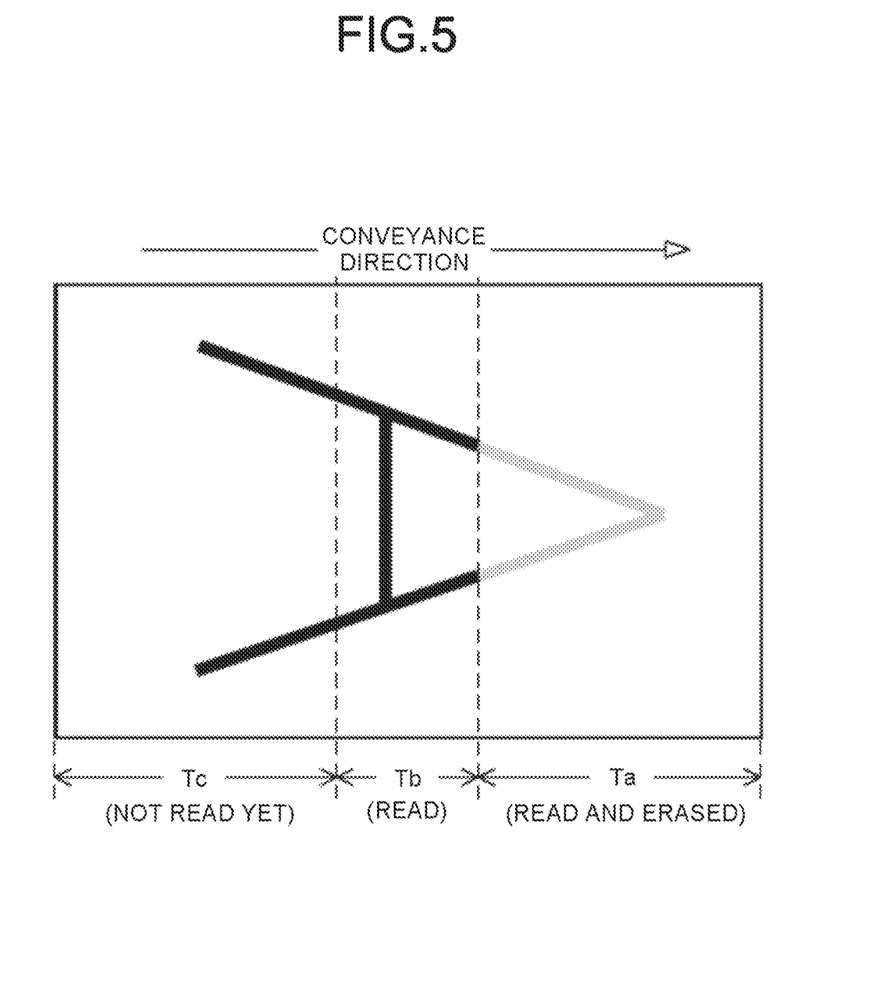
FIG. 5 is a diagram illustrating an example of a portion of an image being partially read before a stop.

FIG. 5 shows an example of the reading state and the decoloring state of the document Pr in a case in which it is determined to be NO in ACT 6, i.e., the document Pr is at the position of the decoloring section 20. An area Ta of the document Pr indicates a portion the document Pr that has passed through the decoloring section 20 and has been subjected to reading and decoloring processing. An area Tb indicates a portion of the document Pr that has been subjected to reading processing by the reading section 13, and an area Tc indicates a portion of the document Pr that has not been read by the reading section 13 yet.

In ACT 6, if it is determined that there is a document Pr at the position of the decoloring section 20 (NO in ACT 6), the control section 150 stores the image data which has been read so far in the image storage section 151 (ACT 8).

Figure 6A:
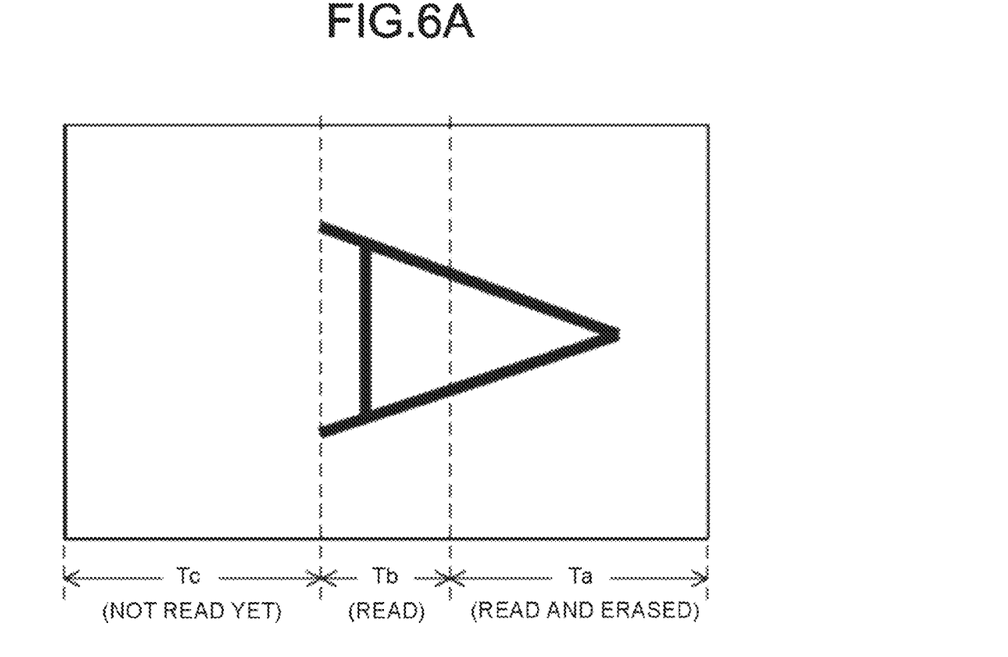
FIG. 6A is a diagram illustrating an example of stored data of the portion of the image that was partially read before the stop.
Figure 6B:
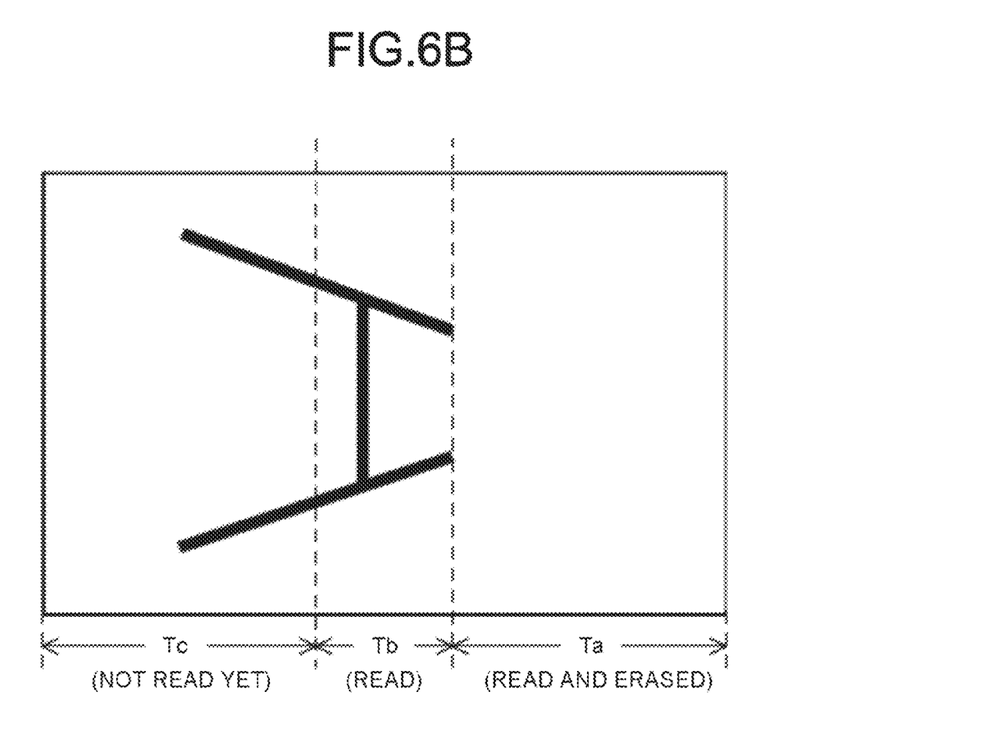
FIG. 6B is a diagram illustrating an example of stored data of a portion of the image read after a re-reading processing.

FIG. 6A shows the areas Ta and Tb, i.e., the portions of the document Pr that has been read by the reading section 13 before the stop due to the jam. In addition, the images of the read areas Ta and Tb are converted into data and stored in the image storage section 151. FIG. 6B shows the areas Tb and Tc of the images which are re-read by the reading section 13 after the first reading processing is stopped and a re-reading processing is performed. The images of the re-read areas Tb and Tc are converted into data and then stored in the image storage section 151. The re-read area includes the area Tb which is not decolored and has been read and stored, and the image data of the area Tb (which has been read twice) is used in the image combination.

After the jam processing of taking out the document Pr which is being read is carried out (ACT 9), ACT 1 is performed again to re-feed the document Pr which was decolored halfway.

In ACT 4, if no paper jam is detected (NO in ACT 4), ACT 10 is performed to determine whether the decoloring processing of the document Pr is completed. If it is determined that the decoloring processing is not completed (NO in ACT 10), processing proceeds to ACT 4. For example, the determination on whether the decoloring processing is completed is carried out by determining whether the document Pr has passed through the decoloring section. That is, if the jam sensor 9 detects that the document Pr has completely passed through the decoloring section, it is determined that the decoloring processing is completed.

In ACT 10, if the decoloring processing is completed (YES in ACT 10), ACT 11 is performed to determine whether there is a plurality of stored image data.

Figure 7:
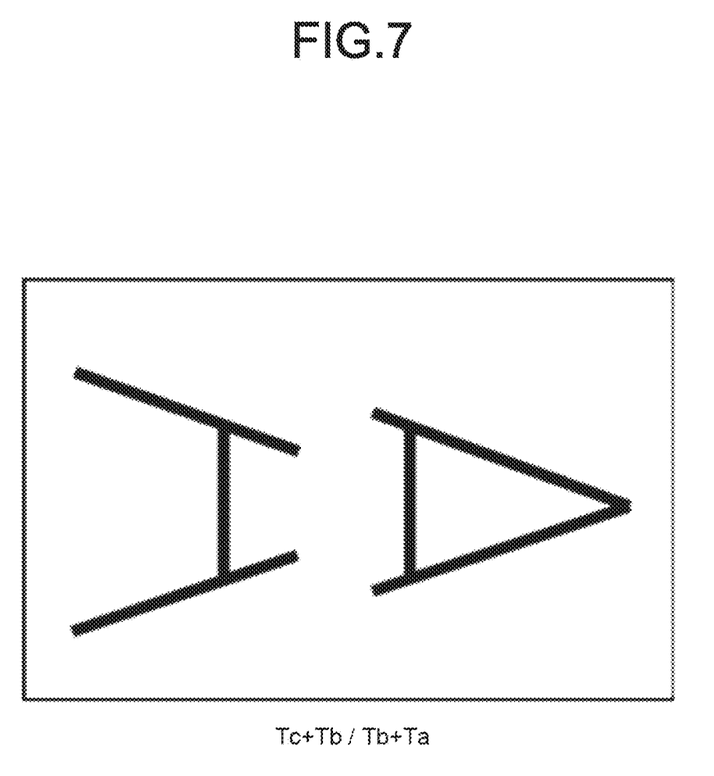
FIG. 7 is a diagram illustrating an example of the stored data of the portion of the image read before the stop and the stored data of the portion of the image read after the re-reading processing.

In ACT 11, it is determined whether there is a plurality of image data stored in the image storage section 151. FIG. 7 shows stored images of the image data read before the stop and the image data re-read after the jam processing.

Figure 8A:
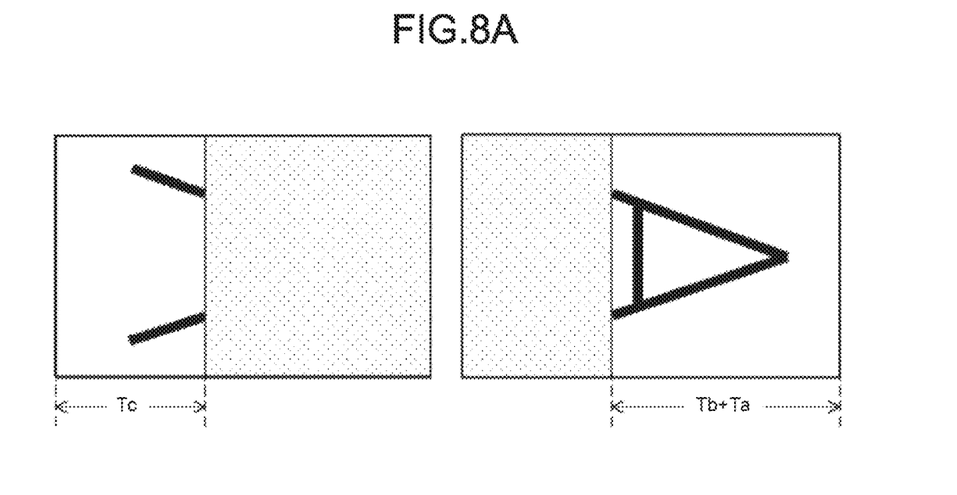
FIG. 8A is a diagram illustrating an example of lengths of the portion of the image read before the stop.
Figure 8B:
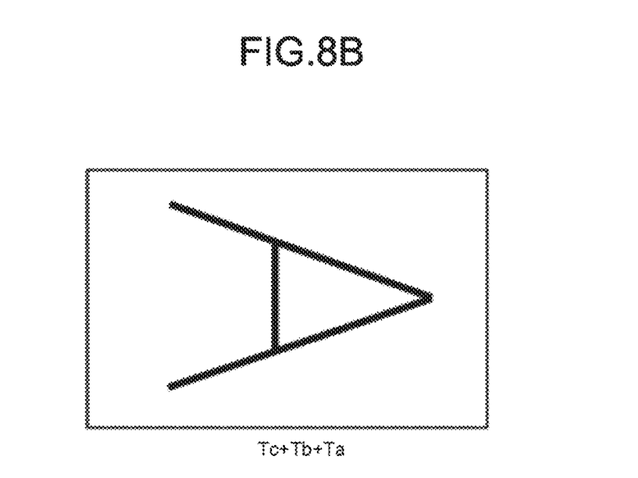
FIG. 8B is a diagram illustrating an example in which the data read of the portion of the image before the stop is combined with the data read of the portion of the image after the re-reading processing.

In ACT 11, if it is determined that there is a plurality of image data (as shown in FIG. 7) in the image storage section 151 (YES in ACT 11), ACT 12 is taken. In ACT 12, a processing is carried out to combine the image data read before the stop and the image data re-read after the jam processing. An example of the combination of the plurality of image data shown in FIG. 7 is shown in FIG. 8A and FIG. 8B. The right half part of FIG. 8A shows the areas Ta and Tb read before the stop. The left half part of FIG. 8A shows the areas Tb and Tc re-read from the same document after the stop.

That is, the image date corresponding to the areas Ta and Tb read before the stop is stored as, for example, the image data of the first 200 lines from the front end of the document Pr. Further, the image data corresponding to the area Tc re-read after the jam processing is stored as, for example, the image data of the lines after the 200th line from the front end of the document Pr.

In ACT 12, the control section 150 carries out a processing of generating image data obtained by combining the image data of the first 200 lines from the front end and the image data of the lines after the 200th line stored in the image storage section 151, and then processing proceeds to ACT 13 to store the combined image data in the image storage section 151 and thereafter to ACT 7.

In ACT 11, in a case in which there is not a plurality of image data in the image storage section 151 (NO in ACT 11), processing proceeds to ACT 13 to store the image data read in ACT 2 in the image storage section 151, and then processing proceeds to ACT 7.

In this way, in a case in which a jam or the like occurs during the reading process of the document which is being subjected to decoloring processing, the read image data corresponding to the partially read portion is stored. After the jam is corrected, the re-reading of the document is carried out, and an operation of combining the re-read image data with the image data that had been read before is carried out. In this way, the image data of the decolored area and the image data of the area which is not yet decolored can be combined.

In the present embodiment, even if an error occurs in the decoloring apparatus during the image reading process, the image data which is decolored and the image data which is not decolored yet can be combined after the decoloring apparatus is restored again. In this way, even in a decoloring apparatus in which the distance between the reading section and the decoloring section is shorter than the length of the smallest paper that can be used in the present embodiment, it is possible to carry out the restoration of the image data when the error occurs, which contributes to downsizing the decoloring apparatus. In addition, the "reading error" in the present embodiment is not limited to the error caused by the sheet jam. For example, the "reading error" includes a reading error that the sheet reading operation is interrupted during the sheet reading process due to the communication failure, a reading error that the sheet reading operation is stopped during the sheet reading process due to the turning-off of the power supply, and the like.

Figure 9A:
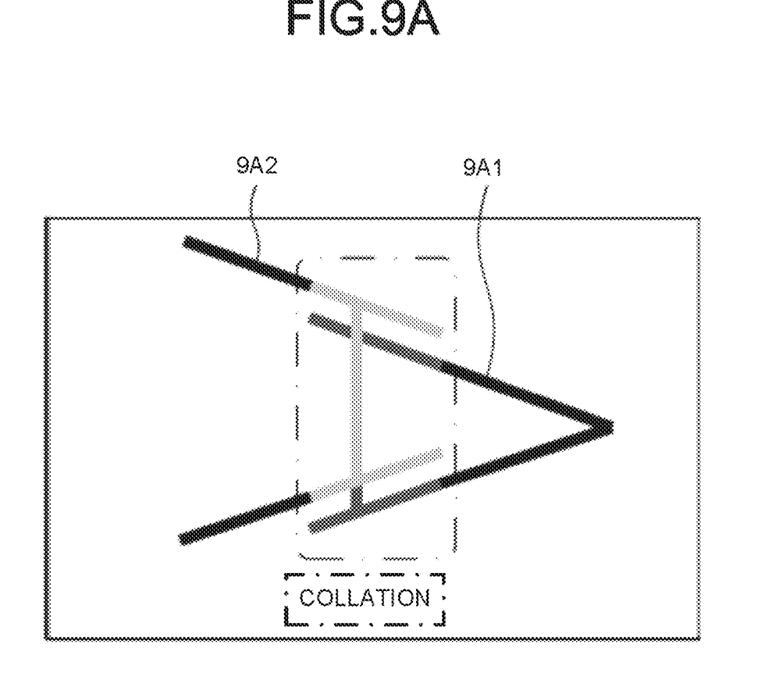
FIG. 9A is a diagram illustrating another example of the stored data of the portion of the image read before the stop and the stored data of the portion of the image read after the re-reading processing.
Figure 9B:
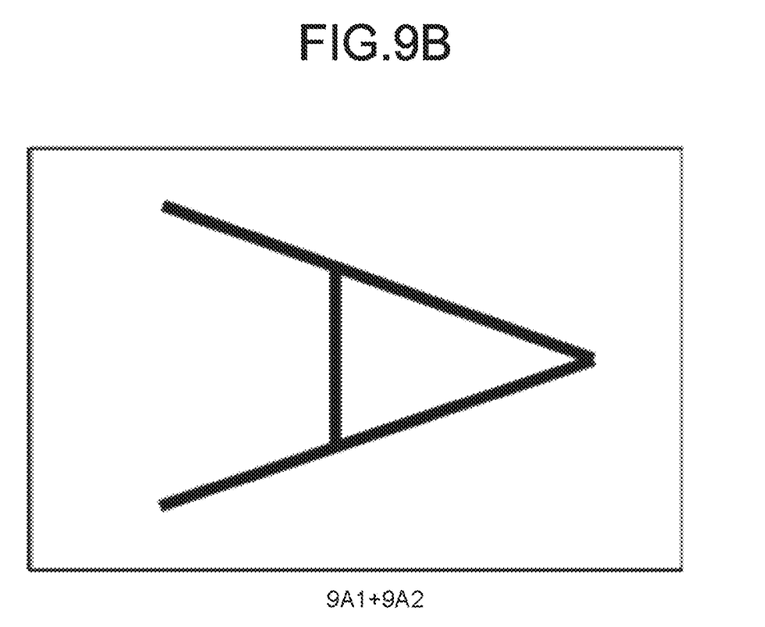
FIG. 9B is a diagram illustrating an example of a combination of the data of the portion of the image read before the stop with the data of the portion of the image read through the re-reading processing.

FIG. 9A and FIG. 9B are diagrams illustrating another example of the image data read before the stop and the image data re-read after the stop.

Image data 9A1 in FIG. 9A represents the image data read before the stop and image data 9A2 represents the image data re-read after the stop. The parts of image data where the image data 9A1 is consistent with the image data 9A2 are collated and overlapped through image processing to generate new image data shown in FIG. 9B.

It is exemplified in the present embodiment that the decoloring apparatus is arranged in the automatic document conveyance section 11. However, the present invention is not limited to this, and the decoloring apparatus according to the present embodiment may also be arranged in the printer section. Further, it is also applicable that the decoloring apparatus according to the present embodiment arranged in another housing separately connected with the image forming apparatus such as the MFP and the like.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A reading apparatus, comprising:
a paper feed section configured to feed a sheet on which an image is formed with decolorable material to a conveyance path;
a reading section positioned on the conveyance path and configured to read the image formed on the sheet and to generate image data corresponding to the read image;
a paper discharge section configured to discharge the sheet after the reading section has read the image; and
a control section configured to perform control to, in a case in which the reading section reads a portion of the image formed on the sheet due to an error:
after the error is resolved, convey the sheet to the reading section again to read a remainder portion of the image that was not initially read in the reading section and to generate image data corresponding to the remainder portion of the image, and
combine the image data corresponding to the read portion of the image with the image data corresponding to the remainder portion of the image.

2. The reading apparatus according to claim 1, wherein the combination of the image data is carried out by combining the first through Nth lines of the image formed on the sheet which are included in the image data corresponding to the read portion of the image data with the Nth+1 through last lines of the image formed on the sheet which are included in the image data corresponding to the remainder portion of the image data.

3. The reading apparatus according to claim 1, wherein the combination of the image data is carried out by collating a part of the image data corresponding to the read portion of the image with an overlapping part of the image data corresponding to the remainder portion of the image.

4. The reading apparatus according to claim 1, wherein the conveyance path is configured to convey the sheet to an image forming section for forming an image.

5. The reading apparatus according to claim 1, further comprising:
an image forming section for forming an image with decolorable toner and an image forming section for forming an image with non-decolorable toner.

6. A method of reading in a reading apparatus that includes a reading section positioned on a conveyance path and configured to read the image formed on the sheet and to generate image data corresponding to the read image, the method comprising the steps of:
conveying a sheet on which an image is formed with decolorable material to the reading section;
determining that, due to an error, the reading section has read a portion of the image formed on the sheet;
storing the image data corresponding to the read portion of the image;
after the error is resolved, conveying the sheet to the reading section again to read a remainder portion of the image that was not initially read in the reading section and generating image data corresponding to the remainder portion of the image; and
combining the image data corresponding to the read portion of the image with the image data corresponding to the remainder portion of the image.

7. The method according to claim 6, wherein the combination of the image data is carried out by combining the first through Nth lines of the image formed on the sheet which are included in the image data corresponding to the read portion of the image data with the Nth+1 through last lines of the image formed on the sheet which are included in the image data corresponding to the remainder portion of the image data.

8. The method according to claim 6, wherein the combination of the image data is carried out by collating a part of the image data corresponding to the read portion of the image with an overlapping part of the image data corresponding to the remainder portion of the image.

9. The method according to claim 6, wherein the conveyance path is configured to convey the sheet to an image forming section for forming an image.

10. The method according to claim 9, further comprising:
conveying the sheet to the image forming section which is configured to form an image with decolorable toner and to form an image with non-decolorable toner.

* * * * *